(12) United States Patent
Watanabe et al.

(10) Patent No.: US 11,946,443 B2
(45) Date of Patent: Apr. 2, 2024

(54) BONDED BODY OF OBJECT TO BE BONDED TO AND FUNCTIONAL BASE MATERIAL

(71) Applicants: ASAHI RUBBER INC., Saitama (JP); HOKUTAKU CO., LTD., Asahikawa (JP)

(72) Inventors: Nobuyoshi Watanabe, Saitama (JP); Hideaki Sato, Saitama (JP); Masafumi Takeyama, Saitama (JP); Yukihiro Oryu, Asahikawa (JP)

(73) Assignees: ASAHI RUBBER INC., Saitama (JP); HOKUTAKU CO., LTD., Asahikawa (JP)

( * ) Notice: Subject to any disclaimer, the term of this patent is extended or adjusted under 35 U.S.C. 154(b) by 23 days.

(21) Appl. No.: 17/782,730

(22) PCT Filed: Dec. 4, 2020

(86) PCT No.: PCT/JP2020/045168
§ 371 (c)(1),
(2) Date: Jun. 6, 2022

(87) PCT Pub. No.: WO2021/112210
PCT Pub. Date: Jun. 10, 2021

(65) Prior Publication Data
US 2022/0341389 A1    Oct. 27, 2022

(30) Foreign Application Priority Data

Dec. 4, 2019  (JP) .................................. 2019-219644

(51) Int. Cl.
*F03D 1/06* (2006.01)
*B32B 7/04* (2019.01)
(Continued)

(52) U.S. Cl.
CPC .............. *F03D 1/0675* (2013.01); *B32B 7/04* (2013.01); *B64C 21/10* (2013.01); *F03D 80/00* (2016.05); *F15D 1/12* (2013.01)

(58) Field of Classification Search
CPC ........... F03D 1/0675; F03D 80/00; F15D 1/12
See application file for complete search history.

(56) References Cited

U.S. PATENT DOCUMENTS

2003/0188885 A1    10/2003  Niinobe et al.
2013/0101426 A1    4/2013   Saitou et al.
(Continued)

FOREIGN PATENT DOCUMENTS

JP        2003-180027 A       6/2003
JP        WO2012/102294 A1    6/2014

OTHER PUBLICATIONS

Jan. 19, 2021 International Search Report issued in International Patent Application No. PCT/JP2020/045168.

*Primary Examiner* — Eldon T Brockman
(74) *Attorney, Agent, or Firm* — Oliff PLC

(57) ABSTRACT

A bonded body wherein functional base material is attached to object to be bonded. Functional base material and object are bonded with functional base material's end portion covered so operational effect neither lost nor adversely affected by fluid, bonded body has strong bonding property preventing functional base material peeled off due to weather. Peelability allows functional base material repair ease. Functional base material provided on object's curved surface to be bonded to along curved and/or smooth surface of object to be bonded to along smooth surface. Functional base material has peripheral side surface with peripheral distal-most end portion. Peripheral gap part provided between object to be bonded to and functional base material on inside of peripheral distal-most end portion and on side opposing to object to be bonded to. Peripheral gap part filled (Continued)

with holding member extending in laminar fan shape from peripheral side surface along curved and/or smooth surface.

14 Claims, 9 Drawing Sheets

(51) Int. Cl.
*B64C 21/10* (2006.01)
*F03D 80/00* (2016.01)
*F15D 1/12* (2006.01)

(56) References Cited

U.S. PATENT DOCUMENTS

2020/0166015 A1* 5/2020 Johansen .............. F03D 1/0675
2022/0154685 A1* 5/2022 Ramanujam .......... F03D 1/0675

* cited by examiner (a)

(b)

BONDED BODY OF OBJECT TO BE BONDED TO AND FUNCTIONAL BASE MATERIAL

TECHNICAL FIELD

The present invention relates to a bonded body in which a functional base material is attached to an object to be bonded such as a rotating body of a blade of a wind power generator which rotates when subjected to wind, or a fin or a fan of a blower, a vehicle subjected to wind when moving at a high speed such as an automobile, a railway vehicle, a transport aircraft, an elevator or a rocket, or a building subjected to strong wind such as a skyscraper, a bridge, or a steel tower, so that the functional base material is prevented from being peeled off due to wind.

BACKGROUND OF THE ART

In order to provide higher rotation efficiency in the wind power generation in which a blade is made to rotate by use of wind as a power source, and to reduce the wind noise generated by the blade, an air flow generator configured to generate air flow by discharge plasma airflow control and suppress the separation of the flow generated by the blade is attached to the blade along the wingspan thereof. In such discharge plasma airflow control, the discharge plasma generated by applying a high voltage between the electrodes disposed to face to each other with an insulator interposed therebetween acts on an object to be bonded such as a blade, and a thin jet flow called an ion wind is thereby induced. The airflow acts on a boundary layer part of flow, and the flow of the boundary layer part is thereby accelerated or disturbed. Accordingly, the separation is suppressed, and the air smoothly flows around the object to be bonded.

The lightning diverter strip configured to guide to the ground the lightning which strikes the blade of the wind power generator is attached to the vicinity of the tip of the blade. A receptor (lightning receiving member) is provided at the tip part of the blade which is most likely to receive lightning, and the current of the lightning which strikes a part other than the tip part of the blade is guided to flow along the surface of the blade through a guide wire of the diverter strip to the receptor, and thereafter to the ground through a lightning protection conductive wire.

The air flowing around a vehicle moving at a high speed, for example, an automobile or an aircraft, generates a vortex which causes traveling resistance on the rear side of the vehicle or a surface accessory of the vehicle. In order to prevent the generation of such a vortex, a vortex generator for vehicle configured to intentionally generate a turbulent flow by use of a turbulent flow forming projection is attached immediately in front of the part at which such a vortex is likely generated, of a door mirror mounting part, a rear fender, a rear part of a roof, a rear part of a trunk, a rear part of a hood, or the like, or a turbulator for aircraft is attached to a blade. In order to reduce the noise caused by a so-called building wind, an air flow generator is attached to a building.

As needed, a protective sheet is applied to protect the surface of a rotating body, a vehicle, a building or the like from being deteriorated by weather, being dented by collision with a stone, sands, hail, small hail, birds, insects or the like, or being eroded, to temporarily protect a damaged part from water, or to protect an airflow control electrode device, an air flow generator, a diverter strip, a vortex generator, or a turbulator.

For example, Patent Document 1 discloses a blade body in which a laminar protective sheet is bonded to at least a part of at least a leading edge of a blade main body made of FRP, and the laminar protective sheet has an adhesive material layer, an intermediate base fabric layer, and a surface durable layer in the order from the side of the blade main body.

The functional base material which is an airflow control electrode device, an air flow generator, or a diverter strip, the functional base material which is a vortex generator or a turbulator with a turbulent flow forming projection, and/or the functional base material such as a protective sheet are configured to protrude from an object to be bonded by the thickness of the functional base material, and the peripheral end portion of the protruding part is thus likely to concentratedly receive the stress caused by weather. Accordingly, when used for a long period of time, the functional base material may be peeled off, twisted, or floated up, and as a result sufficient operational effect may not be exhibited. The functional base material which is bonded strongly so as not to be peeled off is not able to be replaced for repair or mending, and such a functional base material is thus not suitable for the rotating body, the vehicle, the building or the like in a large size which cannot be disassembled at each time of repair or mending required due to disconnection of an airflow control electrode device. If an airflow control electrode device or the like is coated with a hard thick protective sheet in multiple layers so as to prevent peeling-off, weak discharge plasma is generated on the surface of the object to be bonded such as a blade, and the air is less likely to flow.

PRIOR ART DOCUMENT

Patent Document

[Patent Document 1] WO2012/102294

SUMMARY OF THE INVENTION

Problems to be Solved by the Invention

The present invention was made in view of solving the above-described problems, and its object is to provide a bonded body in which a functional base material is attached to an object to be bonded such as a rotating body, a vehicle, a building or the like subjected to wind or other fluid. In the bonded body, the functional base material and the object to be bonded are bonded to each other with the end portion of the functional base material being covered so that the operational effect of the functional base material is neither lost nor adversely affected by the fluid, and so that the bonded body has a strong bonding property preventing the end portion of the functional base material from being peeled due to weather, and a peelability easily allowing the functional base material to be peeled for repair or mending.

Means for Solving Problems

In the bonded body of the functional base material and the object to be bonded developed to achieve the objects described above, the functional base material is provided on a curved surface of the object to be bonded along the curved surface and/or on a smooth surface of the object to be bonded along the smooth surface. A peripheral gap part is provided between the object to be bonded and the functional base material on an inside of a peripheral distal-most end portion of a peripheral side surface of the functional base material and on a side opposing to the object to be bonded, and the peripheral gap part is filled with a holding member extending in a laminar fan shape from the peripheral side surface along the curved surface and/or the smooth surface.

In the bonded body of the functional base material and the object to be bonded according to the aspect described above, the functional base material may be entirely coated with the holding member.

In the bonded body of the functional base material and the object to be bonded according to the aspect described above, the holding member may be a protective film and/or a coating film.

In the bonded body of the functional base material and the object to be bonded according to the aspect described above, the gap part may be formed with the object to be bonded and the functional base material, and/or the functional base material, the object to be bonded, and an auxiliary bonding member, and/or the functional base material, the object to be bonded, and a spacer member, on the inside of the peripheral distal-most end portion.

In the bonded body of the functional base material and the object to be bonded according to the aspect described above, the holding member is preferably formed to extend in a stepless fan shape along the curved surface of the object to be bonded.

In the bonded body of the functional base material and the object to be bonded according to the aspect described above, the holding member has a tip part of the fan shape along the curved surface of the object to be bonded, and the holding member is more preferably formed to extend in the stepless fan shape with a curvature around the tip part set larger than a curvature of the curved surface by a thickness of the functional base material.

In the bonded body of the functional base material and the object to be bonded according to the aspect described above, the peripheral side surface may be inclined so as to spread along toward the side opposing to the object to be bonded, from a side not opposing to the object to be bonded of the functional base material to the peripheral distal-most end portion positioned in a middle of a thickness direction of the functional base material or to the peripheral distal-most end portion positioned on the side opposing to the object to be bonded of the functional base material.

In the bonded body of the functional base material and the object to be bonded according to the aspect described above, the peripheral gap part is formed to extend to the inside of the peripheral distal-most end portion by a length in a range of 1 mm to 5 mm.

In the bonded body of the functional base material and the object to be bonded according to the aspect described above, the functional base material has a thickness of 3 mm at a maximum, as an example.

In the bonded body of the functional base material and the object to be bonded according to the aspect described above, the auxiliary bonding member may be a laminar adhesive material, a laminar double-faced adhesive tape, a laminar double-faced sticky tape, and/or an adhesive layer.

In the bonded body of the functional base material and the object to be bonded according to the aspect described above, the holding member and/or the functional base material are/is preferably coated with a protective layer on the side not opposing to the object to be bonded, and the protective layer is preferably formed to extend in a laminar fan shape along the curved surface and/or the smooth surface.

In the bonded body of the functional base material and the object to be bonded according to the aspect described above, the functional base material is an airflow control electrode device, an air flow generator, a diverter strip, a vortex generator, a turbulator, and/or a protective sheet, as an example.

In the bonded body of the functional base material and the object to be bonded according to the aspect described above, the object to be bonded is any one selected out of a fin, a fan, a blade, an automobile, a railway vehicle, a transport aircraft, an elevator, a rocket, and a building, as an example.

In the bonded body of the functional base material and the object to be bonded according to the aspect described above, the holding member is preferably an elastic body, as an example.

Effects of the Invention

In the bonded body of the object to be bonded and the functional base material of the present invention, the functional base material is provided on the curved surface of the object to be bonded along the curved surface and/or on the smooth surface of the object to be bonded along the smooth surface. The peripheral gap part between the object to be bonded and the functional base material is filled with the holding member extending in a laminar fan shape. The bonded body is thereby formed to extend in a stepless shape as if the peripheral side surface of the functional base material protruding from the curved surface and/or the smooth surface of the object to be bonded is integrated with the curved surface and/or the smooth surface. Accordingly, even when the bonded body is subjected to wind or other fluid, the configuration prevents the functional base material from being peeled off, being twisted, or being floated up in the vicinity of the peripheral end portion of the functional base material.

The bonded body is used for an object to be bonded such as a rotating body, a vehicle, or a building subjected to wind or other fluid, so that various types of operational effects by the functional base material are neither lost nor adversely affected, for example, airflow control such as discharge plasma airflow control, lightning current guide, smoothing of airflow at the time of generation of turbulence or the like, and suppression of vortex generation.

In the bonded body of the object to be bonded and the functional base material, the bonded body is formed to extend in a fan shape so that the functional base material is bonded to the object to be bonded and so that the peripheral side surface of the functional base material is covered by and the peripheral gap part is filled with the holding member. The bonded body has a strong bonding property preventing the functional base material from being peeled off in the end portion thereof due to weather, and a peelability easily allowing the functional base material to be peeled for repair or mending. Accordingly, the bonded body is available in a large sized object to be bonded, for example, a rotating body such as a blade of a wind power generator, a vehicle such as an automobile, a railway vehicle, a transport aircraft, an elevator or a rocket, or a building such as a skyscraper, a bridge, or a steel tower.

MODE FOR CARRYING OUT THE INVENTION

Hereinafter, some aspects of the present invention will be described in detail. However, the scope of the present invention is not limited to these embodiments.

Figure 1:
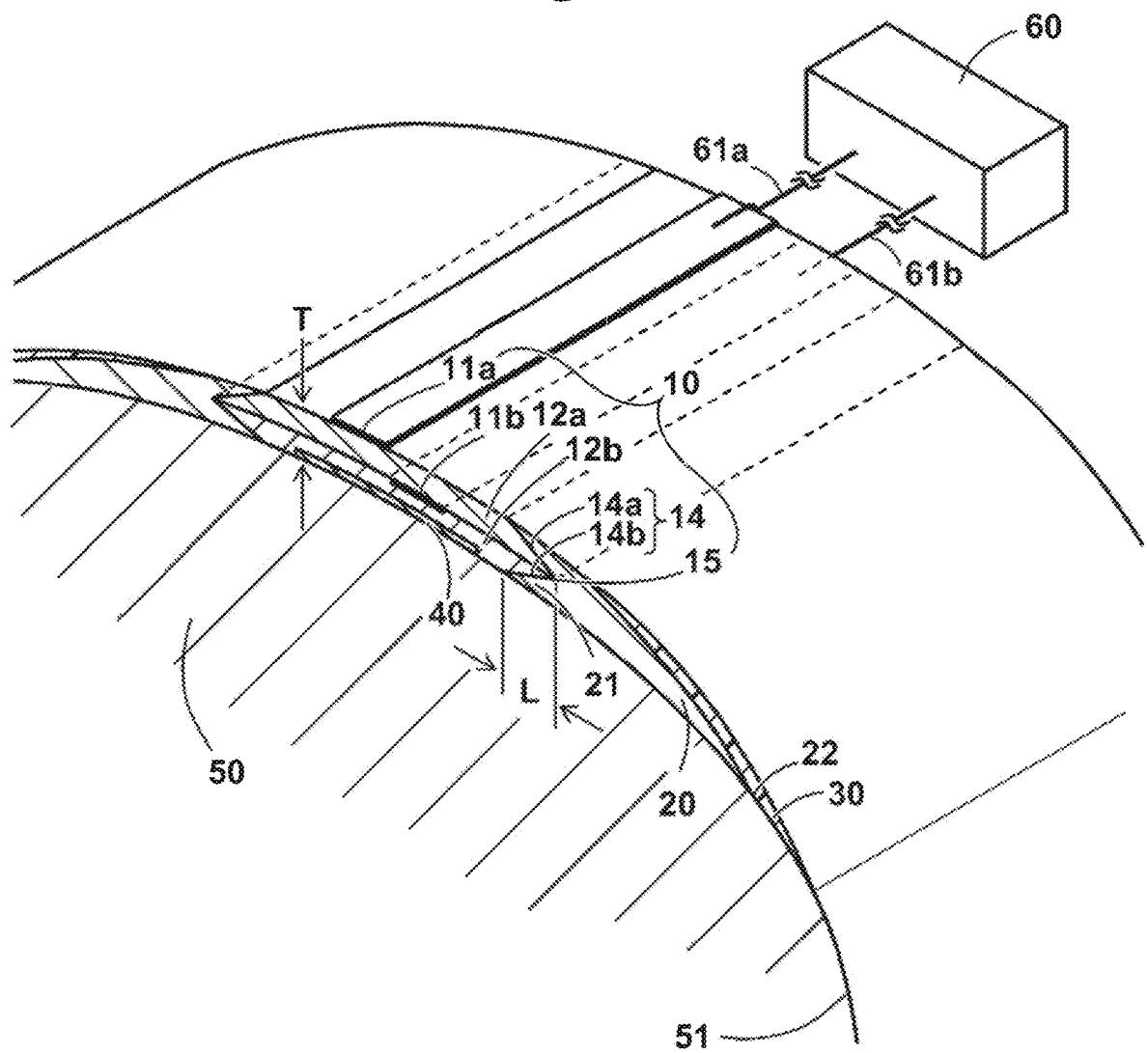
FIG. 1 is a schematic perspective view of a partially-cut-out bonded body of an object to be bonded and a functional base material according to the present invention.

A bonded body 1 of an object to be bonded and a functional base material according to the present invention is described with reference to FIG. 1, and FIG. 1 shows a schematic perspective view of the bonded body 1 in one aspect which is partially cut-out and has a long shape. The bonded body 1 in the aspect shown in FIG. 1 functions as an airflow control electrode device which is attached to the front edge of a blade of a wind power generator.

The bonded body 1 of a functional base material 10 and the blade of the wind power generator which is an object 50 to be bonded to is provided so that the functional base material 10 is arranged at the front edge of the blade on a curved surface 51 of the object 50 to be bonded to, along curved surface 51.

The functional base material 10 has a dielectric base including a lower dielectric base 12b which is arranged on the side opposing to the object 50 to be bonded to and an upper dielectric base 12a which is arranged on the side not opposing to the object 50 to be bonded to. Each of the dielectric bases 12a, 12b is an insulating rubber elastic base.

The functional base material 10 further has an electrode including a first electrode 11a which is arranged on the side not opposing to the object 50 to be bonded to on the upper dielectric base 12a, and a second electrode 11b which is arranged between the upper dielectric base 12a and the lower dielectric base 12b. Each of the electrodes 11a, 11b is a conductive material foil or a conductive material plate, for example, a member in a uniform thickness made of a metal, a conductive resin, or a resin containing metal mesh, and is preferably a conductive material foil, such as a thin metal foil.

The first electrode 11a may be attached on the side not opposing to the object 50 to be bonded to on the upper dielectric base 12a of, for example, an insulating rubber elastic base, by metal deposition and subsequent etching, or may be attached through surface activation treatment to at least one of the upper dielectric base 12a and the metal foil, and subsequently through chemical bond such as ether bond by use of molecular bond.

The second electrode 11b may be attached on the side opposing to the object 50 to be bonded to on the upper dielectric base 12a of, for example, an insulating rubber elastic base, or on the side not opposing to the object 50 to be bonded to on the lower dielectric base 12b of an insulating rubber elastic base, by metal deposition and subsequent etching, or may be attached through surface activation treatment to at least one of the upper dielectric base 12a and the metal foil, and subsequently through addition coupling or substitution coupling by use of molecular bond by a silane coupling agent, for example, a monomolecular layer, or through chemical bond such as ether bond by use of molecular bond by dehydration condensation of a hydroxy group of the surface or a hydroxysilyl group subjected to the surface activation treatment.

The upper dielectric base 12a and the lower dielectric base 12b may be attached to each other together with the second electrode 11b, through surface activation treatment to at least one of the upper dielectric base 12a and the lower dielectric base 12b, and subsequently through addition coupling or substitution coupling by use of molecular bond by a silane coupling agent, for example, a monomolecular layer, or through chemical bond such as ether bond by dehydration condensation of a hydroxy group on the surface or a hydroxysilyl group subjected to the surface activation treatment, or alternatively may be bonded with glue.

The first electrode 11a and the second electrode 11b are arranged so that the inside end surface (the end surface in the right of the figure) of the first electrode 11a along the longitudinal direction (the front-rear direction in the figure) is positioned just above (the upper direction of the thickness direction in the figure) the inside end surface (the end surface in the left side of the figure) of the second electrode 11b along the same longitudinal direction. The extended surface of the bonded surface of the first electrode 11a with the upper dielectric base 12a is arranged in parallel with the extended surface of the bonded surface of the second electrode 11b with the upper dielectric base 12a. In the arrangement, the first electrode 11a and the second electrode 11b are positioned stepwise in parallel with each other.

A metal-joined connection wire 61a is formed to extend from the vicinity of one end of the first electrode 11a, and a metal-joined connection wire 61b is formed to extend from the vicinity of one end of the second electrode 11b. The connection wires 61a, 61b are connected to a power supply unit 60 which incorporates a power supply circuit and a power control circuit.

In the functional base material 10, the lower dielectric base 12b is bonded to the object 50 to be bonded to with an auxiliary bonding member 40 arranged on the middle part of the lower dielectric base 12b on the side opposing to the object 50 to be bonded to. A peripheral gap part 21 is formed between the functional base material 10 and the object 50 to be bonded to.

The functional base material 10 has a thickness T of approx. 3 mm at the maximum. The functional base material 10 has a peripheral side surface 14 of the side surfaces of the upper dielectric base 12a and the lower dielectric base 12b respectively having the half thickness of the thickness T. In the functional base material 10, the peripheral side surface 14 includes a lower peripheral side surface 14b of the lower dielectric base 12b on the side opposing to the object 50 to be bonded to, and an upper peripheral side surface 14a of the upper dielectric base 12a on the side not opposing to the object 50 to be bonded to, with a peripheral distal-most end portion 15 interposed therebetween.

In the functional base material 10, the lower peripheral side surface 14b and the upper peripheral side surface 14a are vertically-symmetrically inclined from the peripheral distal-most end portion 15 inward by a length L. Since the lower peripheral side surface 14b is inclined, a clearance is generated between the functional base material 10 and the object 50 to be bonded to, and a peripheral gap part 21 is thus formed. A clearance is generated among the functional base material 10, the object 50 to be bonded to, and the auxiliary bonding member 40, and the peripheral gap part 21 is thus formed.

A holding member 20 is formed to extend from the peripheral side surface 14 (that is, the lower peripheral side surface 14b and the upper peripheral side surface 14a) in a stepless laminar fan shape along the curved surface 51, so as to fill the peripheral gap part 21 formed between the object 50 to be bonded to and the functional base material 10 on the inside of the peripheral distal-most end portion 15 and on the side opposing to the object 50 to be bonded to.

The holding member 20 may be made of any material as long as the material is excellent in adhesiveness to the upper dielectric base 12a, the lower dielectric base 12b, and the object 50 to be bonded to. The material is preferably excellent in adhesiveness, and may be, for example, silicone rubber or silicone resin, specifically, modified silicone, more specifically, a material with an organic polymer chain the main chain and a silicone unit at the terminal part, may be an epoxy resin, or may be a urethane resin.

The holding member 20 is preferably an elastic body, specifically, an elastic body having a shore hardness of shore A of 80 or lower.

Since the holding member 20 having the configuration described above is formed to extend from the peripheral side surface 14 in a stepless laminar fan shape along the curved surface 51 so as to fill the peripheral gap part 21, the holding member 20 is cured in the inside corresponding to the peripheral gap part 21 and adheres thereto due to the adhesiveness of the holding member 20 to the upper dielectric base 12a, the lower dielectric base 12b, and the object 50 to be bonded to. Moreover, the contact area of the holding member 20 with the lower peripheral side surface 14b and the upper peripheral side surface 14a is remarkably greater than the area in the case without such an inclined surface. Accordingly, the functional base material 10 is fixed firmly. In addition, the configuration prevents peeling-off, twisting, or floating from occurring in the vicinity of the peripheral side surface 14 (that is, the lower peripheral side surface 14b and the upper peripheral side surface 14a) of the functional base material 10.

The holding member 20 having the configuration described above has the tip part of the fan shape along the curved surface 51 of the object 50 to be bonded to, and the curvature around the tip part is set larger than the curvature of the curved surface 51 by the thickness T of the functional base material 10, and is thereby formed to extend in the laminar stepless fan shape. The holding member 20 may have a uniform curvature, or may have a curvature around the tip part of the fan shape gradually changed up to substantially the same value of the curvature of the curved surface 51 of the object 50 to be bonded to, so as to correspond to the curved surface 51 of the object 50 to be bonded to.

As the value of the curvature is set closer to the value of the curvature of the curved surface 51, the range of the laminar fan shape becomes greater. The curvature may be appropriately set so as to correspond to the curved surface 51 of the object 50 to be bonded to in the range allowing the holding member 20 to be formed to extend in a stepless fan shape.

The holding member 20 having the configuration described above is provided simply so as to be bonded to the lower peripheral side surface 14b and the upper peripheral side surface 14a of the peripheral side surface 14 of the functional base material 10, and is preferably provided so as not to exceed the upper peripheral side surface 14a, as shown in FIG. 1.

Although the figure only shows the holding member 20 having the configuration described above in the state of being bonded to the peripheral side surface 14 of the functional base material 10 along the wingspan direction, the holding member 20 is naturally bonded to the peripheral side surface of the functional base material 10 both on the blade root side and the tip side along the wingspan direction, in the similar manner (not shown).

The holding member 20 having the configuration described above may be coated with a protective layer 30 as needed. The functional base material 10 may also be coated with the protective layer 30 as needed. However, if the first electrode 11a is coated with a thicker layer, discharge plasma air flow is less likely generated. Accordingly, it is preferable that the first electrode 11a is not coated or is coated with a thin layer allowing the discharge plasma air flow to be generated.

The functional base material 10 may be partially or entirely coated with the protective layer 30 on the side not opposing to the object 50 to be bonded to. In this case, it is preferable that at least the peripheral side surface 14 of the functional base material 10 is coated on the side not opposing to the object 50 to be bonded to, and that the first electrode 11a is not coated in order that discharge plasma air flow is easily generated from the first electrode 11a.

The protective layer 30 may be made of any material as long as the protective layer 30 is capable of protecting the holding member 20 as a major target and the functional base material 10 as needed, and is preferably made of a fluorine-based resin, a urethane-based resin, an acryl-based resin, or a silicone-based resin.

The lower dielectric base 12b has a recessed portion recessed inward toward the side not opposing to the object 50 to be bonded to, and the auxiliary bonding member 40 is fitted therein and bonds the lower dielectric base 12b and the object 50 to be bonded to. Alternatively, the lower dielectric base 12b may not have such a recessed portion, and the auxiliary bonding member 40 may bond the lower dielectric base 12b and the object 50 to be bonded to.

Examples of the auxiliary bonding member 40 include a laminar adhesive material, a laminar double-faced adhesive tape, a laminar double-faced sticky tape, an adhesive layer, and/or a molecular bond layer.

The example shown in FIG. 1 has been described, in which the functional base material 10 is provided at the front edge of the blade on the curved surface 51 of the object 50 to be bonded to. Alternatively, the functional base material 10 may be provided on a smooth surface of the object 50 to be bonded to, for example, on the upper surface or the lower surface of the blade, or in the vicinity of the tip part of the blade (not shown). The smooth surface may be not only a curved surface, but also a flat surface.

Figure 2:
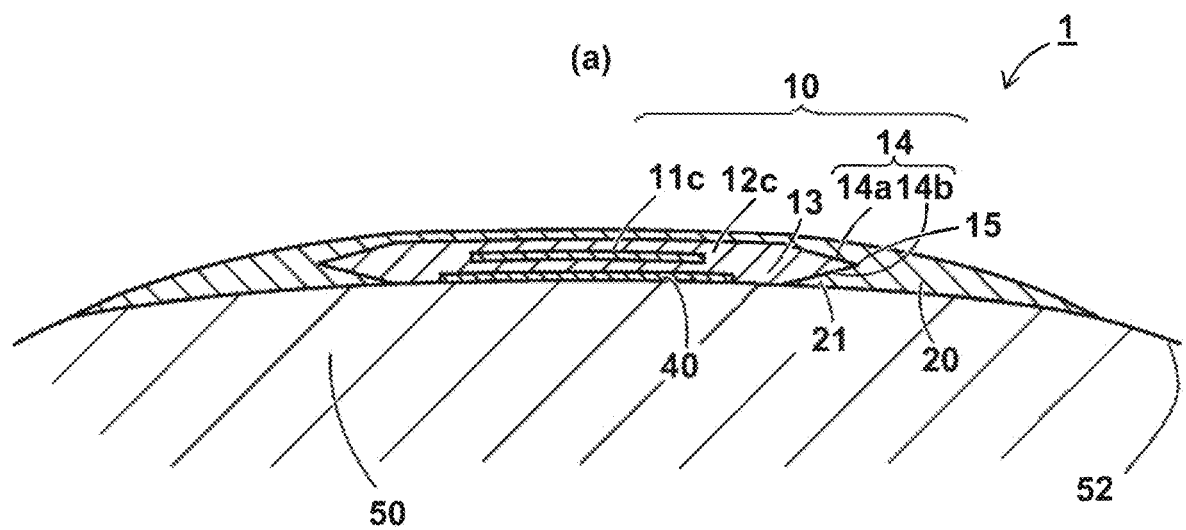
FIG. 2 is a schematic cross-sectional view of the bonded body of the object to be bonded and the functional base material according to the present invention.
Figure 2:
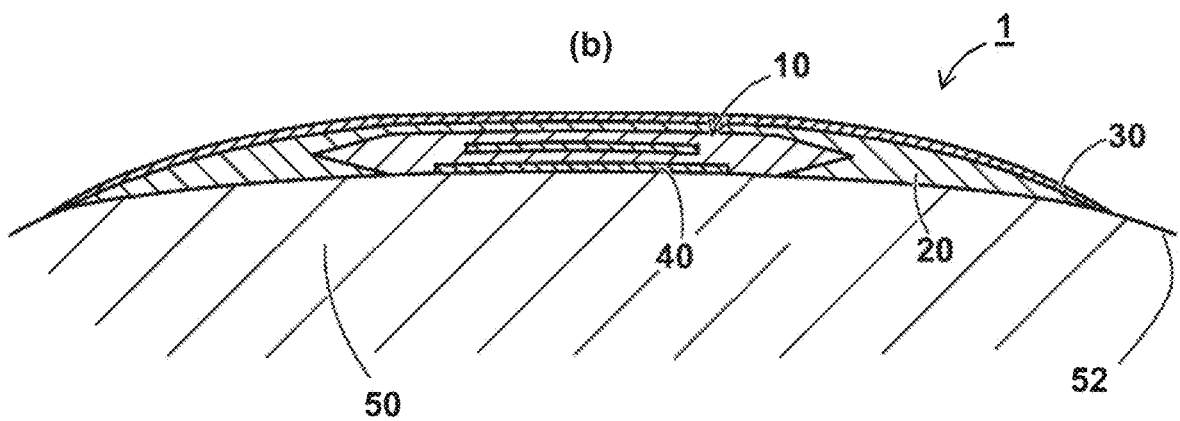

FIG. 1 shows the example in which the holding member 20 is formed to extend from the side part of the functional base material 10 in the laminar fan shape, and is coated with the protective layer 30 as needed. Alternatively, as shown in FIG. 2(a), the functional base material 10 may be entirely coated with the holding member 20.

In the case of the example shown in FIG. 2(a), the holding member 20 has the both functions of the caulking allowing to firmly hold the functional base material 10 and the protective coating allowing to protect the functional base material 10. Accordingly, it is preferable that the holding member 20 has excellent adhesiveness with respect to the upper dielectric base 12a, the lower dielectric base 12b, and the object 50 to be bonded to, preventing peeling-off, and has proper elasticity hardly allowing tearing or scraping by sands, rain, hail, small hail, sleet or the like.

In this case, the material of the holding member 20 is not limited to a specific material. The holding member 20 is preferably made of a material excellent in adhesiveness and elasticity. Examples of the material include a fluorine resin, a fluororubber, a silicone resin, a silicone rubber, an epoxy resin, a urethane resin, an ethylene-propylene-diene rubber, an ethylene-propylene-diene-methylene rubber, an isobutylene-isoprene copolymer rubber, an isoprene rubber, and a natural rubber. Preferable examples among them are a silicone rubber, an epoxy resin, and a urethane resin, which exhibit excellent erosion resistance and adhesiveness. More preferable examples among them are a silicone rubber and a silicone resin, specifically, a modified silicone, more specifically, a silicone rubber with an organic polymer chain in the main chain and a silicone unit at the terminal part.

A composition for the holding member 20 may be made to contain the component enhancing adhesiveness such as a molecular adhesive, and the holding member 20 may be formed by applying the composition. The curved surface 51 of the object 50 to be bonded to and the functional base material 10 may be subjected to the surface treatment in which a molecular adhesive is made to react with a surface functional group thereof, for example, a hydroxyl group, and the holding member 20 may be formed by applying the composition for the holding member 20 on the resultant surfaces.

The functional group may be formed on the surface by applying at least one of a corona treatment, an ultraviolet treatment, an excimer treatment, and ITRO treatment.

Examples of the molecular adhesive include a silane coupling agent, a silanol compound, an aluminate compound, a titanate compound, a triazine ring-containing compound, a thiol compound, an epoxy compound, and an amine compound. A silane coupling agent is preferable among them. More preferable examples include a silane compound containing a vinyl group and an alkoxy group: a silane compound containing a vinyl group and an acetoxy group, specifically, a silane coupling agent having two to six units of vinyl alkoxy silane having a vinyl alkoxy silyl group; a silane compound containing a styryl group and an alkoxy group; a silane compound containing a (meth)acrylic group and an alkoxy group; a silane compound containing an allyl group and an alkoxy group, and a silane compound containing an alkynyl group and an alkoxy group.

As shown in FIG. 2(b), also the holding member 20 may be coated with the protective layer 30. Examples of the protective layer 30 include the one described above.

The holding member 20 having the configuration described above is formed directly with a liquid raw material composition by an appropriate application method such as coating, spraying, or dipping.

Figure 3:
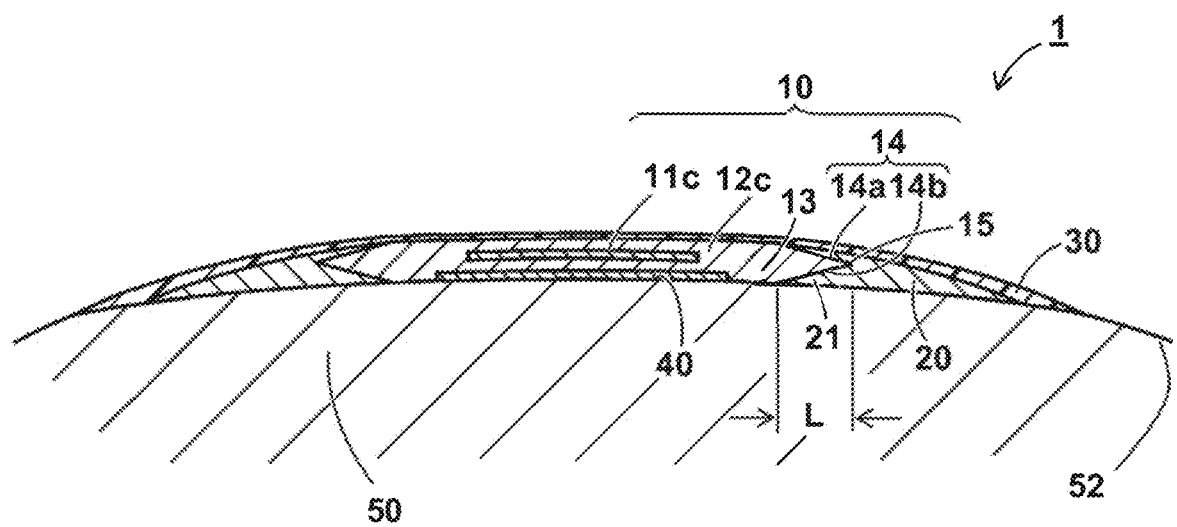
FIG. 3 is a schematic cross-sectional view of another bonded body of an object to be bonded and a functional base material according to the present invention.

FIG. 3 shows a schematic cross-sectional view of the bonded body in another aspect of an object to be bonded and a functional base material which is attached on a flat surface in the vicinity of the tip of a blade of a wind power generator so as to function as a lightning diverter strip.

In the bonded body 1 shown in FIG. 1, the functional base material 10 includes the first electrode 11a and the second electrode 11b in a pair, and two bases of the upper dielectric base 12a and the lower dielectric base 12b. Alternatively, in the bonded body 1 shown in FIG. 3, the functional base material 10 includes a plurality of metal chips 11c of diverter strips arranged at a constant interval, and an integrated dielectric base 12c. In the dielectric base 12c, the lower peripheral side surface 14b and the upper peripheral side surface 14a of the peripheral side surface 14 are vertically-symmetrically inclined from the peripheral distal-most end portion 15 inward by the length L. The peripheral gap part 21 is thus formed between the lower peripheral side surface 14b of the functional base material 10 and the object 50 to be bonded to. The holding member 20 is formed to extend from the peripheral side surface 14 including the lower peripheral side surface 14b and the upper peripheral side surface 14a in a stepless laminar fan shape along a curved smooth surface 52 so as to fill the peripheral gap part 21, and the functional base material 10 is thereby bonded firmly. The protective layer 30 is formed to extend in a stepless laminar fan shape along the smooth surface 52 so as to thickly cover the holding member 20 and thinly cover the functional base material 10.

Each of FIG. 4 to FIG. 7 shows a schematic cross-sectional view of the bonded body 1 in another aspect of an object to be bonded and a functional base material which functions as a lightning diverter strip. The bonded body 1 shown in each figure will be described mainly with respect to differences from the bonded body 1 shown in FIG. 3.

Figure 4:
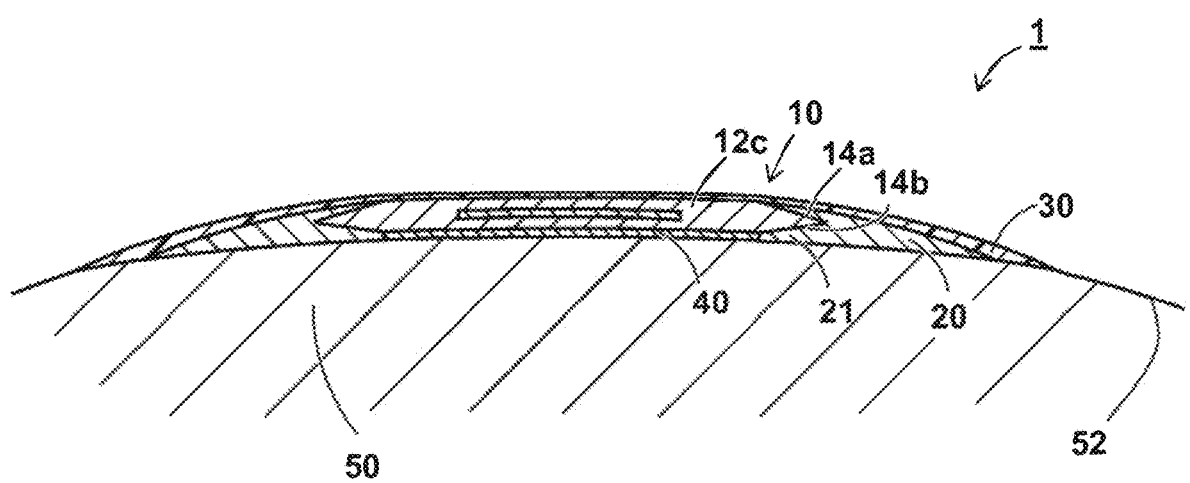
FIG. 4 is a schematic cross-sectional view of a bonded body in another aspect of an object to be bonded and a functional base material according to the present invention.

As shown in FIG. 4, in the bonded body 1, the functional base material 10 includes the dielectric base 12c having the lower peripheral side surface 14b and the upper peripheral side surface 14a, and the auxiliary bonding member 40 is attached on the portion in contact with the object 50 to be bonded to of the functional base material 10 on the side of the smooth surface 52 of the object 50 to be bonded to, and the peripheral gap part 21 is thereby formed with the auxiliary bonding member 40 protruding from the functional base material 10, the lower peripheral side surface 14b, and the object 50 to be bonded to.

Figure 5:
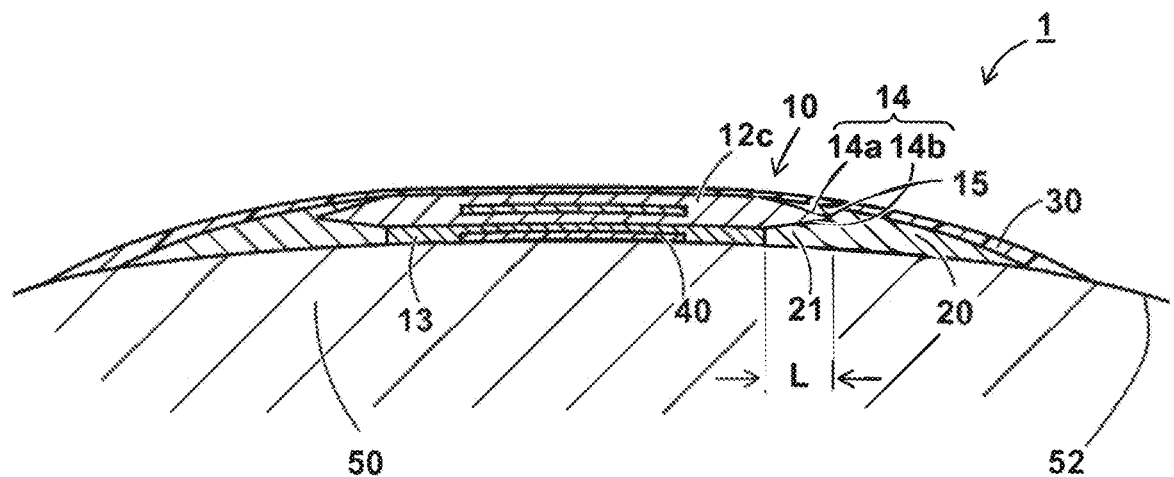
FIG. 5 is a schematic cross-sectional view of a bonded body in another aspect of an object to be bonded and a functional base material according to the present invention.

As shown in FIG. 5, in the bonded body 1 in another aspect, the dielectric base 12c has the peripheral side surface 14 including the lower peripheral side surface 14b and the upper peripheral side surface 14a which are vertically-symmetrically inclined from the peripheral distal-most end portion 15 inward by the length L, and the bonded body 1 has, on the side of the smooth surface 52 of the object 50 to be bonded to, a spacer member 13 which is shorter in length by the length L inward from the peripheral distal-most end portion 15. The spacer member 13 and the dielectric base 12c of the functional base material 10 are pasted to each other with molecular bond, a glue, or an adhesive. The dielectric base 12c and the object 50 to be bonded to may be pasted to each other with the auxiliary bonding member 40 fitted in a recessed portion of the spacer member 13, or may be pasted to each other with a glue or an adhesive not shown. The peripheral gap part 21 is thereby formed with the spacer member 13 protruding from the functional base material 10, the lower peripheral side surface 14b, and the object 50 to be bonded to.

Figure 6:
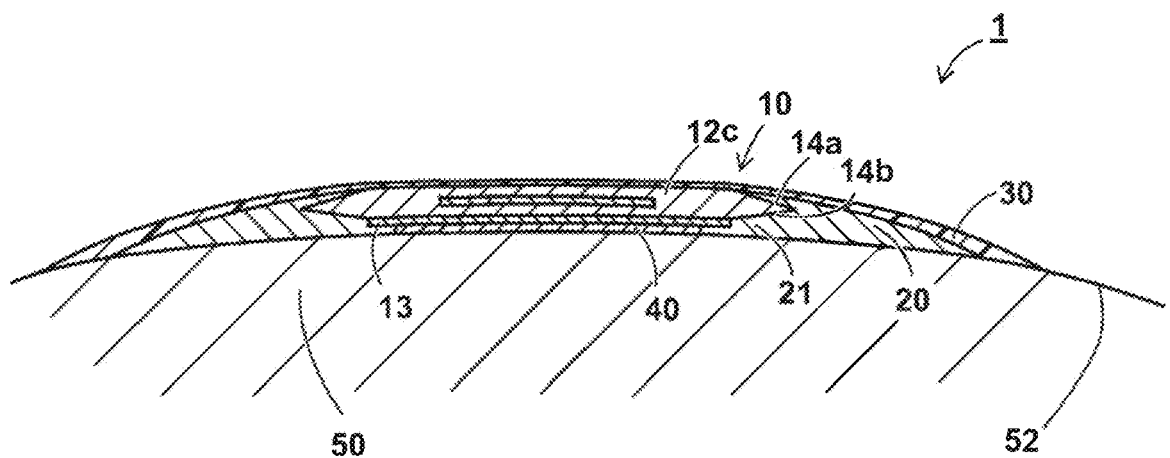
FIG. 6 is a schematic cross-sectional view of a bonded body in another aspect of an object to be bonded and a functional base material according to the present invention.

As shown in FIG. 6, in the bonded body 1 in another embodiment, the spacer member 13 may have no recessed portion unlike the spacer member 13 shown in FIG. 5, and the dielectric base 12c and the object 50 to be bonded to may be pasted to each other with the auxiliary bonding member 40 having the same length or a slightly shorter length compared with the spacer member 13. The peripheral gap part 21 is thereby formed with the spacer member 13 and the auxiliary bonding member 40 respectively protruding from the functional base material 10, the lower peripheral side surface 14b, and the object 50 to be bonded to.

Figure 7:
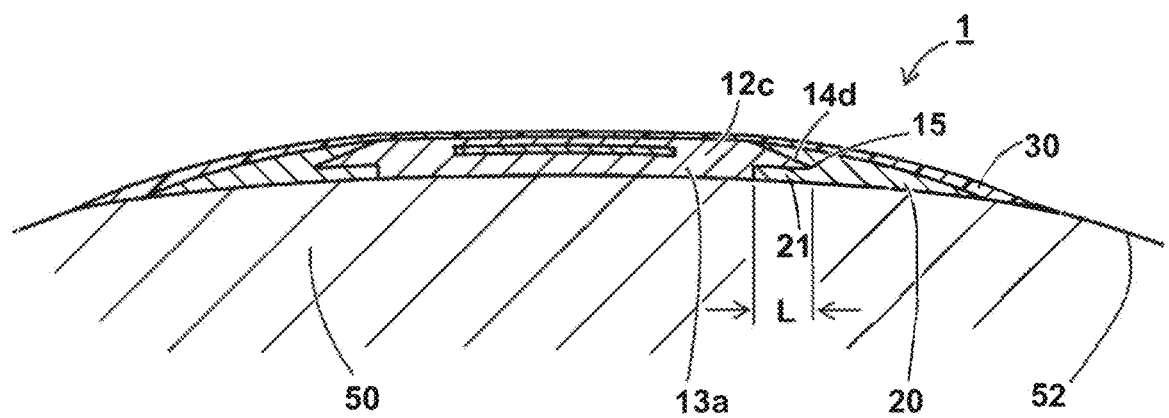
FIG. 7 is a schematic cross-sectional view of a bonded body in another aspect of an object to be bonded and a functional base material according to the present invention.

In each of the bonded bodies 1 shown in FIG. 1 to FIG. 5, the lower peripheral side surface 14b of the lower dielectric base 12b is inclined from the peripheral distal-most end portion 15 inward by the length L so that the lower dielectric base 12b has a shorter length as closer to the object 50 to be bonded to. Alternatively, as shown in FIG. 7, in the bonded body 1, the dielectric base 12c may have, on the side not opposing to the object 50 to be bonded to, an upper peripheral side surface 14d which is inclined in a fan shape to the peripheral distal-most end portion 15 from the part shifted inward by the length L from the peripheral distal-most end portion 15, and may further have, on the side of the smooth surface 52 of the object 50 to be bonded to, a spacer part 13a which is shorter in length by the length L inward from the peripheral distal-most end portion 15, and the peripheral gap part 21 may be thereby formed. The peripheral gap part 21 formed in a substantially quadrangular prism shape as in the bonded body 1 shown in FIG. 7 has a more complicated shape and has a greater area in contact with the object 50 to be bonded to and the functional base material 10, compared with the peripheral gap part 21 formed in a substantially trigonal prism shape with the lower peripheral side surface 14b simply inclined as in the bonded body 1 shown in each of FIG. 1 to FIG. 5. The functional base material 10 is thereby fixed firmly. The spacer part 13a and the object 50 to be bonded to may be pasted to each other with a glue or an adhesive, or may be pasted to with the auxiliary bonding member 40.

Figure 8:
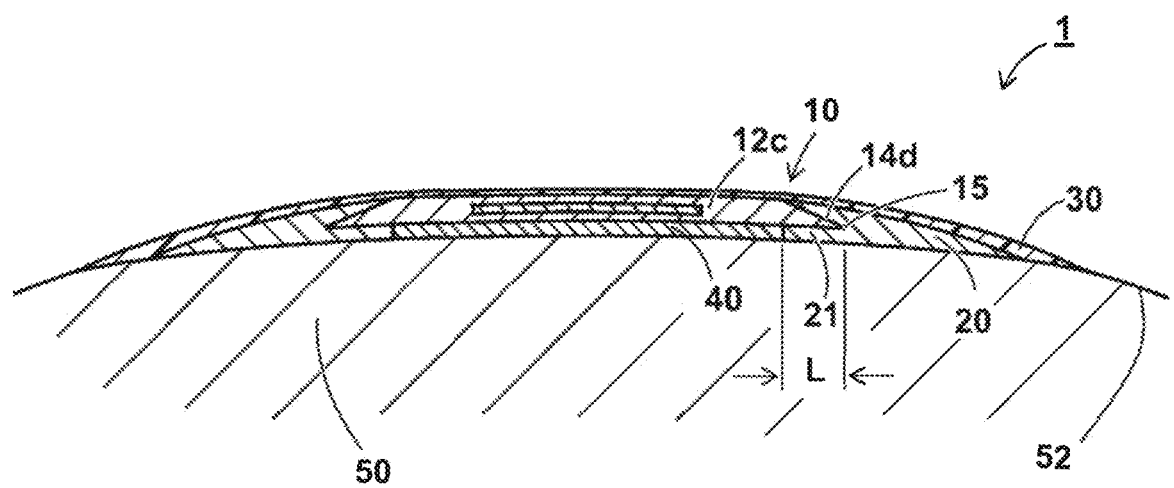
FIG. 8 is a schematic cross-sectional view of a bonded body in another aspect of an object to be bonded and a functional base material according to the present invention.

As shown in FIG. 8, in the bonded body 1, the dielectric base 12c may have, only on the side not opposing to the object 50 to be bonded to, the upper peripheral side surface 14d which is shorter in length inward by the length L from the peripheral distal-most end portion 15, and the auxiliary bonding member 40 which also functions as a spacer member may be attached on the portion in contact with the object 50 to be bonded to of the dielectric base 12c on the side of the smooth surface 52 of the object 50 to be bonded to, and the peripheral gap part 21 may be thereby formed.

Figure 9:
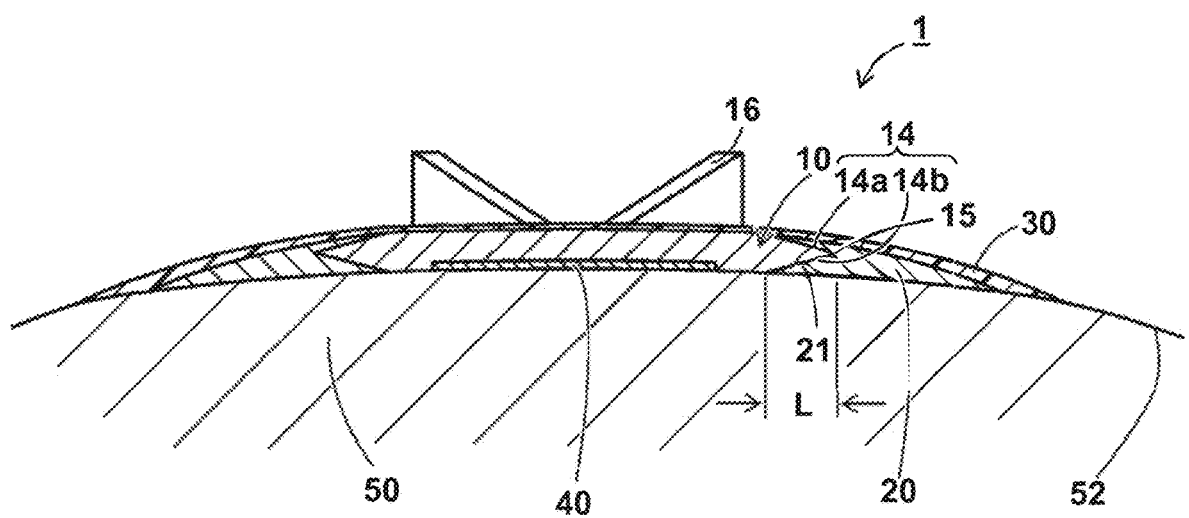
FIG. 9 is a schematic cross-sectional view of a bonded body in another aspect of an object to be bonded and a functional base material according to the present invention.

FIG. 9 shows a schematic cross-sectional view of the bonded body 1 in another aspect functioning as a vortex generator or a turbulator, including the object 50 to be bonded to of a vehicle such as an automobile and the functional base material 10 to which a turbulent flow forming projection 16 is attached.

As shown in FIG. 9, in the bonded body 1, the hard-resin functional base material 10 which is molded integrally with the hard-resin turbulent flow forming projection 16 is attached to the object 50 to be bonded to. In the functional base material 10, the lower peripheral side surface 14b and the upper peripheral side surface 14a are vertically-symmetrically inclined from the peripheral distal-most end portion 15 inward by the length L. Since the lower peripheral side surface 14b is inclined, the peripheral gap part 21 is formed. The functional base material 10 is pasted to the object 50 to be bonded to with the auxiliary bonding member 40 which is fitted in a recessed portion or on the surface without any recessed portion of the functional base material 10, on the side opposing to the object 50 to be bonded to (on the side of the smooth surface 52). The holding member 20 is formed to extend from the peripheral side surface 14 including the lower peripheral side surface 14b and the upper peripheral side surface 14a in a stepless laminar fan shape along the curved smooth surface 52 so as to fill the peripheral gap part 21, and the functional base material 10 is thereby bonded firmly. The protective layer 30 is formed to extend in a stemless laminar fan shape along the smooth surface 52, on the holding member 20 and the functional base material 10 as needed.

In the bonded body 1, the value of the curvature formed with the functional base material 10 and the holding member 20, and the protective layer 30 and the auxiliary bonding member 40 as needed is preferably close to the value of the curvature of the object 50 to be bonded to.

Figure 10:
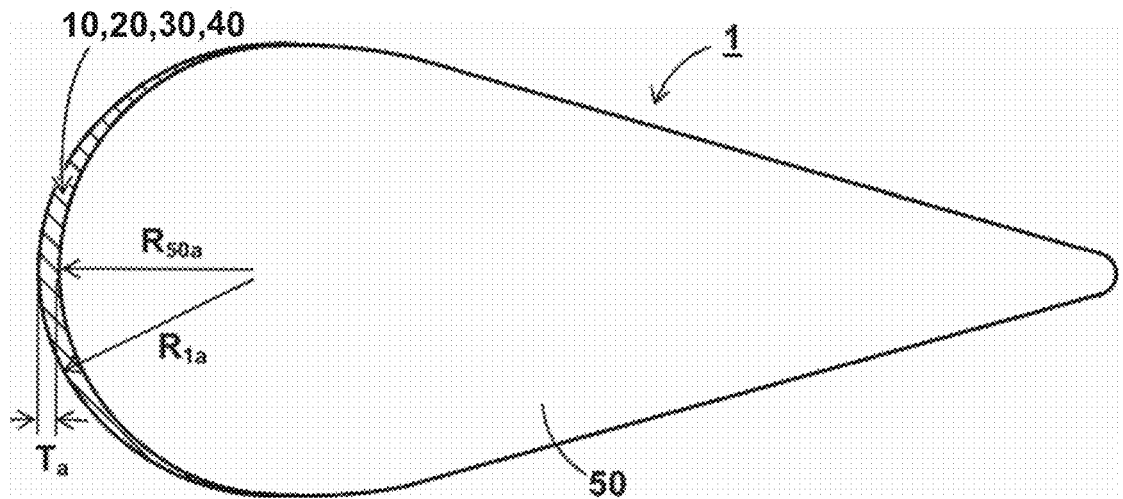
FIG. 10 is a schematic diagram schematically illustrating a curvature of a bonded body and a curvature of an object to be bonded in another aspect, according to the present invention.
Figure 10:
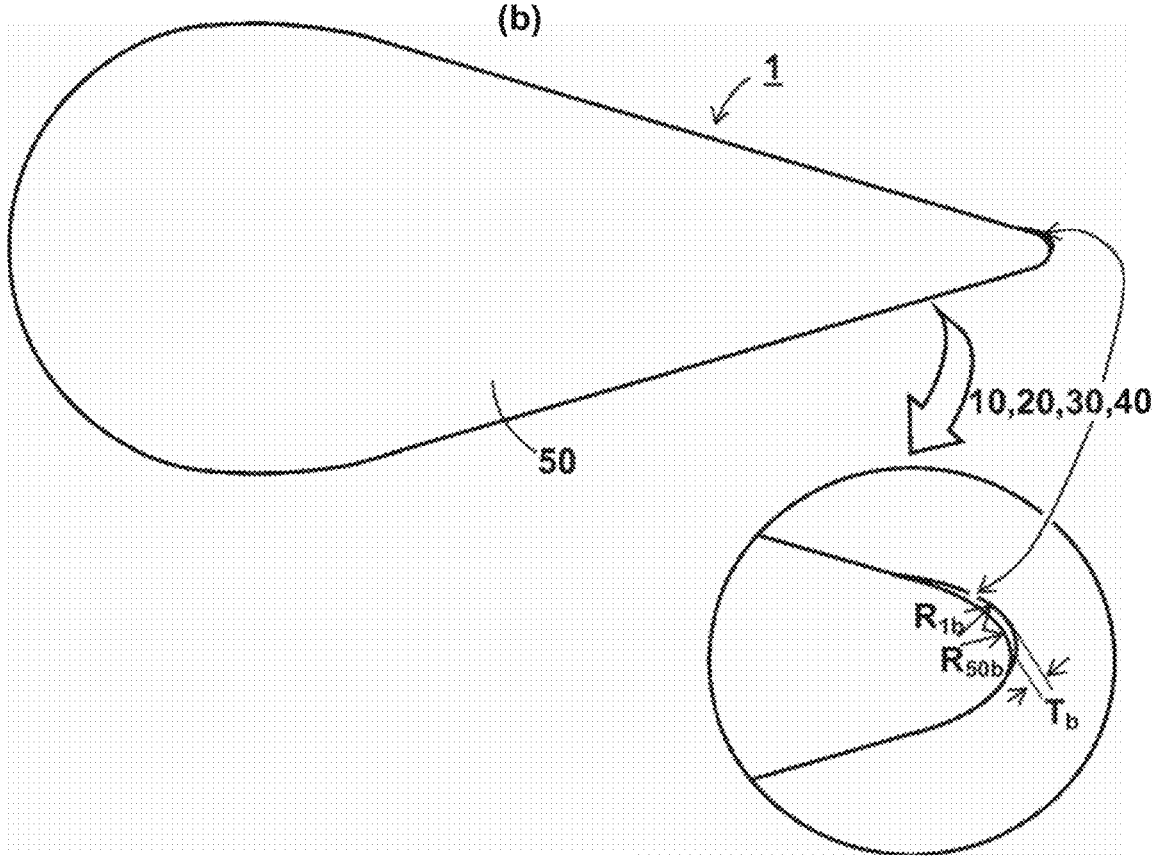

For example, FIG. 10(a) shows a schematic cross-sectional view of a blade of a wind power generator as the object 50 to be bonded to. In this example in which the functional base material 10, the holding member 20, the protective layer 30, and the auxiliary bonding member 40 are formed in a maximum total thickness $T_a$ on the curved surface of the front edge of the blade, the circular arc of the front edge of the object 50 to be bonded to having a radius $R_{50a}$ of curvature and the circular arc of the front edge of the exterior of the bonded body 1 (that is, the exterior of the functional base material 10, the holding member 20, the protective layer 30, and the auxiliary bonding member 40) having a radius $R_{1a}$ of curvature are formed so that the circular arcs have the same edge parts without any step therebetween.

In the example shown in FIG. 10(b) in which the functional base material 10, the holding member 20, the protective layer 30, and the auxiliary bonding member 40 are formed at the rear edge of the blade in a maximum total thickness $T_b$ on the smooth surface which is substantially flat but slightly curved, the circular arc of the front edge of the object 50 to be bonded to having a radius $R_{50b}$ of curvature and the circular arc of the front edge of the exterior of the bonded body 1 (that is, the exterior of the functional base material 10, the holding member 20, the protective layer 30, and the auxiliary bonding member 40) having a radius $R_{1b}$ of curvature are formed so that the circular arcs have the same edge parts without any step therebetween.

Since the curvatures of the exteriors of the bonded body 1 respectively depend on the total thicknesses $T_a$, $T_b$ of the functional base material 10, the holding member 20, the protective layer 30, and the auxiliary bonding member 40, the total thicknesses $T_a$, $T_b$ are preferably set as small as possible, and more preferably set to 3.5 mm or less. It is preferable that the holding member 20 is formed smoothly in the range of five times or more of the values of the total thicknesses $T_a$, $T_b$ of the functional base material 10 to the auxiliary bonding member 40. As described above, the curvature of the exterior of the object 50 to be bonded to, for example, a blade surface of a wind power generator, is preferably extended due to the holding member 20, as described above.

Figure 11:
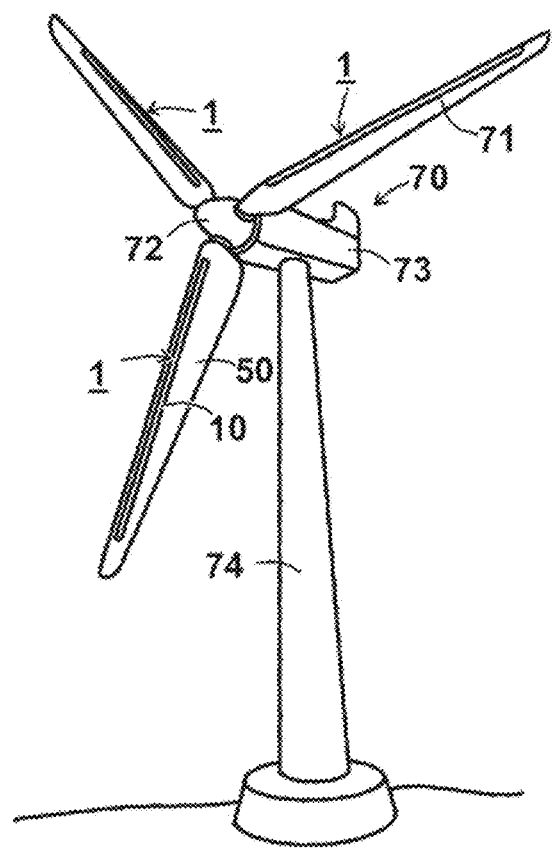
FIG. 11 is a perspective view of a bonded body in another aspect of an object to be bonded and a functional base material according to the present invention.

As shown in FIG. 11, the bonded body 1 may be used as an air flow generator to be attached to a blade 71 of a wind power generator 70 as the object 50 to be bonded to. In an example, a nacelle 73 is provided on the upper end of a tower 74 provided on the ground, and three units of the blades 71 are provided to a rotatable hub 72 configured to protrude from the nacelle 73. The nacelle 73 or the hub 72 houses a power supply unit 11 (refer to FIG. 1) incorporating a power supply circuit and a power control circuit, and further houses an angle adjusting device for the blades 71, and a power generator (not shown) to which a speed increaser, a brake device, and a power transmission shaft are connected along the shaft of the hub 72. The functional base material 10 which exhibits the action of an air flow generator has substantially the same length as the blade 71, and is attached in the vicinity of the front edge of the blade 71.

Figure 12:
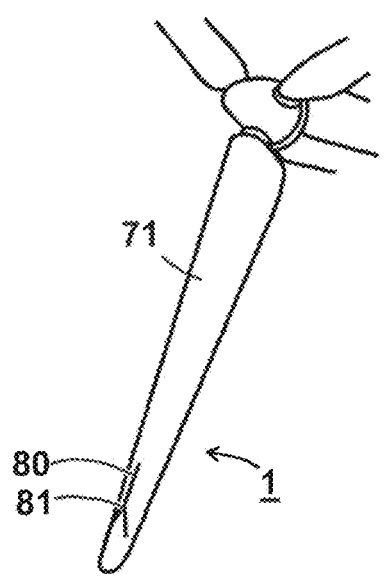
FIG. 12 is a perspective view of a bonded body in another aspect of an object to be bonded and a functional base material according to the present invention.

As shown in FIG. 12, the bonded body 1 may be a diverter strip 80 to be attached to the blade 71 of a wind power generator. The diverter strip 80 is connected to a receptor 81. The diverter strip 80 and the receptor 81 are connected to a ground wire (not shown).

The bonded body 1 may be used as a vortex generator or a turbulator, which is not shown. Such a bonded body may be provided to a fin or a fan of an electric product or a small-sized product such as a compression/decompression air pump or a decompressor, to a blade of a wind power generator, or to a large-sized product such as a vehicle, a train, an elevator, a rocket, or a building, as an air flow generator, a diverter strip, a vortex generator, or a turbulator.

Embodiments

Hereinafter, embodiments according to the present invention and a comparative example not according to the present invention will be described.

The bonded bodies having edges in different structures according to the present invention were produced, and the durability performances thereof were evaluated. Table 1 indicates the list of the produced structures of the edges.

TABLE 1

| | Structure of Edge |
|---|---|
| Example 1 | The edge having a doglegged shape in cross-sectional view, formed by cutting a silicone rubber sheet having a thickness of 1.5 mm from the upper and lower surfaces thereof at an angle of 45° with respect to the thickness direction |
| Example 2 | The edge formed by cutting a silicone rubber sheet having a thickness of 1.5 mm at an angle of 45°, and by bonding another silicone rubber sheet having a thickness of 0.5 mm to the original sheet at the position shifted inward by 1.5 mm from the edge part (bonding a sheet having a width of 37 mm to a sheet having a width of 40 mm) |
| Comparative Example 1 | The structure of the edge cut off at a right angle |

(Production of Functional Base Material)

A silicone rubber sheet having 120 mm×40 mm×2 mm in size was produced by using a silicone rubber of TSE221-5U (manufactured by MOMENTIVE PERFORMANCE MATERIALS Japan). A functional base material was obtained by cutting the edge in the longitudinal direction of the produced silicone rubber sheet at an angle of 45° by a cutter into a predetermined shape.

(Production of Holding Member)

The produced functional base material was placed on a PET sheet, and the cut edge was coated with a silicone sealant of TB5222L (manufactured by ThreeBond Co., Ltd.) as a holding member. In the coating, a proper quantity of the material was applied on the side surface of the cut edge, and spread by using a metal scraper so as to sufficiently bury the cut surface of the functional base material and to form a layer in substantially the same thickness as that of the functional base material. After the coating, the produced member was left to stand and cured at room temperature for 24 hours, and the bonded body was thereby obtained.

(Production of Protective Layer)

First, a masking tape having 120 mm×30 mm in size was applied for masking to the center of the functional base material on the surface of the produced bonded body. The portion not masked of the surface of the bonded body was thereafter subjected to a corona discharge treatment at a speed of 70 mm/s and an output voltage of 14 kV by the corona discharge treatment apparatus of CoronaMaster PS-1M (manufactured by Shinko Electric & Instrumentation Co., Ltd.). After the surface treatment, the diluted solution obtained by diluting the amino silane coupling agent of KBM-603 (manufactured by Shin-Etsu Chemical Co., Ltd.) with ethanol to a concentration of 0.1% was applied on the surface subjected to the surface treatment, and the surface was dried at room temperature. After the drying, FLUOREX FINISH (name of product manufactured by Chugoku Marine Paints, Ltd.) was applied as a protective layer by use of a brush. After the application, the produced member was left to stand and cured at room temperature for 24 hours, and the bonded body with the protective layer was thereby obtained.

(Erosion Resistance Test)

Figure 13:
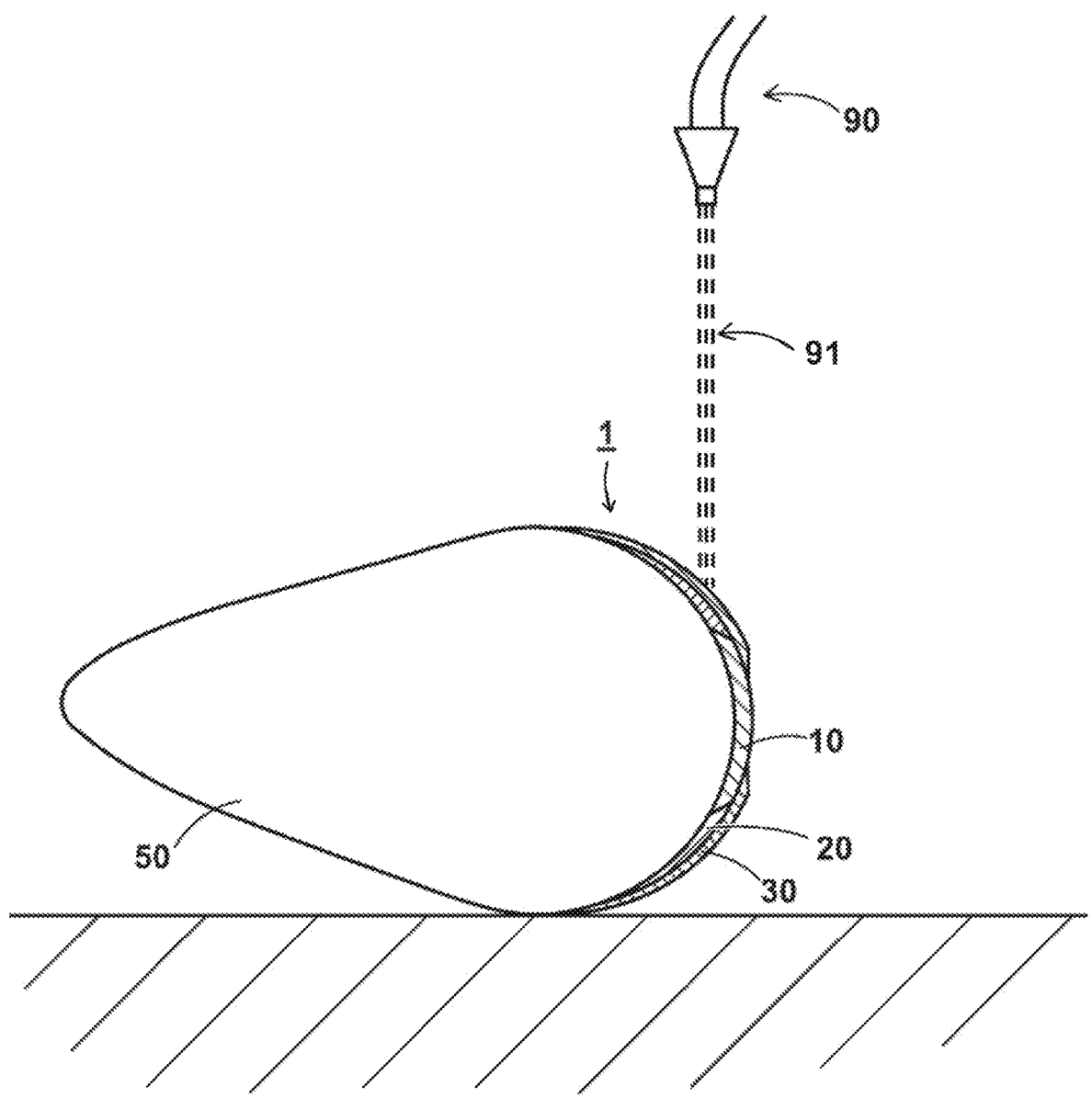
FIG. 13 is a schematic diagram of a blasting test in evaluating a sample of the bonded body of the object to be bonded and the functional base material according to the present invention.
Figure 14:
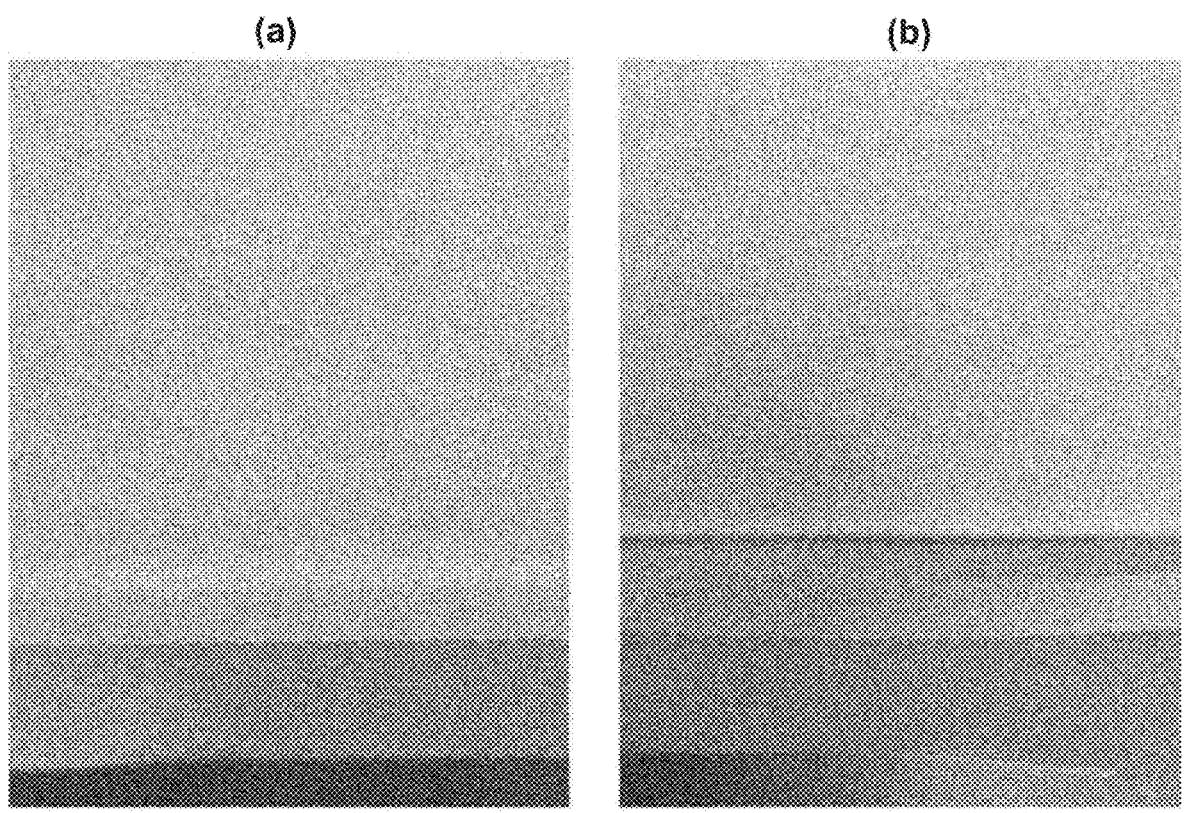
FIG. 14 indicates photographs of the states before and after the blasting test, of the sample of the bonded body of the object to be bonded and the functional base material according to the present invention.

Various types of the produced bonded bodies with protective layers were tested in accelerated test with respect to erosion resistance by use of a blasting device. In the test method, as in the test conditions schematically shown in FIG. 13, the produced bonded body 1 with the protective layer 30 was fixed to a pseudo windmill blade, resin media 91 were blasted from a nozzle 90 of the blasting device to the boundary between the functional base material 10 and the holding member 20, and evaluation was conducted on the basis of the time until the functional base material and the holding member are peeled off. FIG. 14(a) shows a photograph before the test, and FIG. 14(b) shows a photograph after the test. The column made of acrylonitrile butadiene styrene copolymerized resin having a diameter of 84.2 mm was used as the pseudo windmill blade, and the fixing was conducted with a layered double-sided adhesive tape of No. 5302A (manufactured by Nitto Denko Corporation) as the auxiliary bonding member 40. The blasting was conducted by the blast cleaning machine of PNEUMA-BLASTER FD-4ST(B)S-501-H668 (manufactured by Fuji Manufacturing Co., Ltd.) as the blasting device, with the resin media of PLAMEDIA (manufactured by U.S. TECHNOLOGY, FAR EAST Co., Ltd.) having a particle diameter of 200 μm to 700 μm, at an air flow rate of 893 L/min. Table 2 shows the results.

TABLE 2

|  | Blasting Time | | | | | |
| --- | --- | --- | --- | --- | --- | --- |
|  | 30 sec | 60 sec | 90 sec | 120 sec | 150 sec | 180 sec |
| Example 1 | Good | Good | Good | Good | Failed | Failed |
| Example 2 | Good | Good | Good | Good | Good | Failed |
| Comparative Example 1 | Good | Failed | Failed | Failed | Failed | Failed |

As indicated in Table 2, the functional base materials and the holding members of Example 1 and Example 2 have stronger strength compared with those of Comparative Example 1.

INDUSTRIAL APPLICABILITY

The bonded body of the object to be bonded and the functional base material of the present invention is provided to a fin or a fan of an electric product or a small-sized product such as a compression/decompression air pump or a decompressor, to a blade of a wind power generator, or to a large-sized product such as a vehicle, a train, an elevator, a rocket, or a building, in order to make wind flow smoothly, efficiently guide wind to a blade, a fan, or a fin, reduce noise by reducing frictional sound caused by the air, or ground lightning.

REFERENCE SIGNS LIST

1: bonded body, 10: functional base material, 11a: first electrode, 11b: second electrode, 11c: plurality of metal chips of diverter strips, 12a, 12b, 12c: dielectric base, 13: spacer member, 13a: spacer part, 14: peripheral side surface, 14a: upper peripheral side surface, 14b, 14c: lower peripheral side surface, 14d: upper peripheral side surface, 15: peripheral distal-most end portion, 16: turbulent flow forming projection, 20: holding member, 21: peripheral gap part, 30: protective layer, 40: auxiliary bonding member, 50: object to be bonded, 51: curved surface, 52: smooth surface, 60: power supply unit, 61a, 61b: connection wire, 70: wind power generator, 71: blade, 72: hub, 73: nacelle, 74: tower, 80: diverter strip, 81: receptor, 90: nozzle of blasting device, T: thickness, $T_a$, $T_b$: total thickness, L: length, $R_{1a}$, $R_{1b}$: curvature of bonded body, $R_{50a}$, $R_{50b}$: curvature of object to be bonded

What is claimed is:

1. A bonded body of an object to be bonded and a functional base material, wherein:
the functional base material is provided on a curved surface of the object to be bonded along the curved surface and/or on a smooth surface of the object to be bonded along the smooth surface, a peripheral gap part is provided between the object to be bonded and the functional base material on an inside of a peripheral distal-most end portion of a peripheral side surface of the functional base material and on a side opposing to the object to be bonded, and the peripheral gap part is filled with a holding member extending in a laminar fan shape from the peripheral side surface, along the curved surface and/or the smooth surface,
the functional base material has
an electrode including a first electrode arranged on a side not opposing to the object to be bonded, and a second electrode arranged in a dielectric base, or has metal chips of a diverter strip arranged at an integrated dielectric base, or metal foil,
the gap part is formed with the object to be bonded and the functional base material, and/or the functional base material, the object to be bonded and an auxiliary bonding member, and/or the functional base material, the object to be bonded and a spacer member, on the inside of the peripheral distal-most end portion,
the second electrode or the metal chips or the metal foil, and the dielectric base, and also the holding member and the object to be bonded are bonded by molecular bond through addition coupling or substitution coupling with a monomolecular layer of a molecular adhesive or dehydration condensation coupling of a hydroxy group on the surface or a hydroxysilyl group subjected to the surface activation treatment, or by becoming a corona treatment surface, an ultraviolet treatment surface, an excimer treatment surface or an ITRO treatment surface, and
the functional base material is filled by the holding member with a lower peripheral part at the gap part from more peripheral side than the second electrode or the metal chips or the metal foil.

2. The bonded body of the object to be bonded and the functional base material according to claim 1, wherein the functional base material is entirely coated with the holding member.

3. The bonded body of the object to be bonded and the functional base material according to claim 2, wherein the holding member is a protective film and/or a coating film.

4. The bonded body of the object to be bonded and the functional base material according claim 1, wherein the holding member is formed to extend in a stepless fan shape along the curved surface of the object to be bonded.

5. The bonded body of the object to be bonded and the functional base material according to claim 4, wherein the holding member extends in the stepless fan shape, in which the holding member has a tip part of the fan shape along the curved surface of the object to be bonded, and a curvature around the tip part is set larger than a curvature of the curved surface by a thickness of the functional base material.

6. The bonded body of the object to be bonded and the functional base material according to claim 1, wherein the peripheral side surface is inclined so as to spread along toward the side opposing to the object to be bonded, from a side not opposing to the object to be bonded of the functional base material to the peripheral distal-most end portion positioned in a middle of a thickness direction of the functional base material or to the peripheral distal-most end portion positioned on the side opposing to the object to be bonded of the functional base material.

7. The bonded body of the object to be bonded and the functional base material according to claim 1, wherein the peripheral gap part is formed to extend to the inside of the peripheral distal-most end portion by a length in a range of 1 mm to 5 mm.

8. The bonded body of the object to be bonded and the functional base material according to claim 1, wherein the functional base material has a thickness of 3 mm at a maximum.

9. The bonded body of the object to be bonded and the functional base material according to claim 1, wherein the auxiliary bonding member is a laminar adhesive material, a laminar double-faced adhesive tape, a laminar double-faced sticky tape, and/or an adhesive layer.

10. The bonded body of the object to be bonded and the functional base material according to claim 1, wherein the holding member and/or the functional base material are/is coated with a protective layer on the side not opposing to the object to be bonded, and the protective layer is formed to extend in a laminar fan shape along the curved surface and/or the smooth surface.

11. The bonded body of the object to be bonded and the functional base material according to claim 1, wherein the functional base material is an airflow control electrode device, an air flow generator, a diverter strip, a vortex generator, a turbulator, and/or a protective sheet.

12. The bonded body of the object to be bonded and the functional base material according to claim 1, wherein the object to be bonded is any one selected out of a fin, a fan, a blade, an automobile, a railway vehicle, a transport aircraft, an elevator, a rocket, and a building.

13. The bonded body of the object to be bonded and the functional base material according to claim 1, wherein the holding member is an elastic body.

14. The bonded body of the object to be bonded and the functional base material according to claim 1, wherein the molecular adhesive is selected from the group consisting of a silane coupling agent, a silanol compound, an aluminate compound, a titanate compound, a triazine ring-containing compound, a thiol compound, an epoxy compound, and an amine compound.

* * * * *